(12) United States Patent
Hong

(10) Patent No.: US 10,180,315 B2
(45) Date of Patent: Jan. 15, 2019

(54) APPARATUS FOR MEASURING THREE-DIMENSIONAL SHAPE USING PRISM

(71) Applicant: KOH YOUNG TECHNOLOGY INC., Seoul (KR)

(72) Inventor: Jong Kyu Hong, Anyang-si (KR)

(73) Assignee: KOH YOUNG TECHNOLOGY INC., Seoul (KR)

( * ) Notice: Subject to any disclaimer, the term of this patent is extended or adjusted under 35 U.S.C. 154(b) by 0 days.

(21) Appl. No.: 15/511,852

(22) PCT Filed: Sep. 17, 2015

(86) PCT No.: PCT/KR2015/009792
§ 371 (c)(1),
(2) Date: Mar. 16, 2017

(87) PCT Pub. No.: WO2016/043543
PCT Pub. Date: Mar. 24, 2016

(65) Prior Publication Data
US 2017/0292833 A1 Oct. 12, 2017

(30) Foreign Application Priority Data
Sep. 17, 2014 (KR) .......................... 10-2014-0123864

(51) Int. Cl.
*G01B 11/00* (2006.01)
*G01B 5/04* (2006.01)
(Continued)

(52) U.S. Cl.
CPC .......... *G01B 11/24* (2013.01); *G01B 9/02022* (2013.01); *G01B 11/06* (2013.01); *G01B 11/0608* (2013.01); *G02B 5/04* (2013.01)

(58) Field of Classification Search
None
See application file for complete search history.

(56) References Cited

U.S. PATENT DOCUMENTS 5,126,872 A * 6/1992 Birkle .................. G01N 21/952
356/24
5,309,212 A * 5/1994 Clark .................... G01S 17/325
356/141.1
(Continued)

FOREIGN PATENT DOCUMENTS

JP 05-118880 5/1993
JP 06-331329 * 12/1994
(Continued)

OTHER PUBLICATIONS

International Search Report for International Application No. PCT/KR2015/009792, dated Dec. 14, 2015.
(Continued)

*Primary Examiner* — Shawn Decenzo
*Assistant Examiner* — Jarreas C Underwood
(74) *Attorney, Agent, or Firm* — Kile Park Reed & Houtteman PLLC

(57) ABSTRACT

The present disclosure relates to a three-dimensional shape measurement apparatus for obtaining height information of a measurement target object using a prism. The three-dimensional shape measurement apparatus includes an illumination unit irradiating light on the measurement target object, a prism unit receiving reflective light reflected from the measurement target object and directing the reflective light to an image formation lens, an imaging unit receiving the reflective light from the prism unit and capturing an image of the reflective light, and a height measurement unit measuring a height of the measurement target object based on the image captured by the imaging unit.

10 Claims, 5 Drawing Sheets

(51) Int. Cl.
  *G01B 11/24* (2006.01)
  *G01B 11/06* (2006.01)
  *G01B 9/02* (2006.01)
  *G02B 5/04* (2006.01)

(56) References Cited

U.S. PATENT DOCUMENTS

| | | | | |
|---|---|---|---|---|
| 5,661,294 A | * | 8/1997 | Buchmann | G01N 21/9054 |
| | | | | 209/526 |
| 5,785,651 A | * | 7/1998 | Kuhn | G01B 11/026 |
| | | | | 250/339.06 |
| 5,905,595 A | * | 5/1999 | Minami | G01N 21/8806 |
| | | | | 356/241.1 |
| 6,788,411 B1 | * | 9/2004 | Lebens | G01N 21/21 |
| | | | | 356/364 |
| 6,924,897 B2 | * | 8/2005 | Parks | G02B 21/00 |
| | | | | 356/508 |
| 7,880,891 B1 | * | 2/2011 | Kim | G01B 9/021 |
| | | | | 356/457 |
| 2003/0179385 A1 | * | 9/2003 | Fujiwara | G01B 11/254 |
| | | | | 356/605 |

FOREIGN PATENT DOCUMENTS

| | | | |
|---|---|---|---|
| JP | 07-260420 | | 10/1995 |
| JP | 2005-24534 | | 1/2005 |
| KR | 10-2011-0086222 | | 7/2011 |
| KR | 10-2012-0071899 | * | 7/2012 |

OTHER PUBLICATIONS

Chinese Office Action with English translation for Chinese Application No.: 201580050324.9, dated Sep. 21, 2018.

\* cited by examiner

APPARATUS FOR MEASURING THREE-DIMENSIONAL SHAPE USING PRISM

TECHNICAL FIELD

The present disclosure relates to an apparatus for measuring a three-dimensional shape of an object to be measured and, more particularly, to a three-dimensional shape measuring apparatus for acquiring height information of a measurement target object using a prism.

The present disclosure was derived from studies that have been carried out as part of an industrial source technology development project of the Ministry of Knowledge Economy of Republic of Korea [Assignment specific number: 10040097, Assignment name: Development of technology on minimal-invasive multiple-degree-of-freedom surgical robot system for medical surgical robot video-based otolaryngology operation and neurosurgery operation].

BACKGROUND ART

In general, at least one printed circuit board (PCB) is provided in an electronic device. On such printed circuit board, devices having a variety of shapes are mounted. For inspecting defects or the like of such devices, a three-dimensional shape measuring apparatus is typically used.

In a conventional three-dimensional shape measuring apparatus, light is irradiated on a measurement target object such as a PCB. A reflective image of the measurement target object is then captured using a camera. Then, a three-dimensional shape based on the height of the measurement target object is measured using the reflective image thus captured.

The measuring apparatus includes an illumination unit that provides light toward the measurement target object and a camera that captures an image of the measurement target object using the reflective light reflected from the measurement target object. In the apparatus, the camera includes an image formation lens through which the reflective light passes. The camera captures the image of the measurement target object by receiving the reflective light that has passed through the image formation lens.

FIGS. 1A and 1B are configuration diagrams of a conventional three-dimensional shape measuring apparatus. Referring to FIGS. 1A and 1B, an illumination unit 1 irradiates light on a measurement target object via a beam splitter 2. The light reflected from the measurement target object travels toward an imaging unit 7 via an objective lens 3, an aperture 4, an image formation lens 5, and a pinhole 6. A control unit 8 moves the imaging unit 7 along a z-axis (in a direction normal to a substrate) so that an image captured by the imaging unit 7 is in focus. As shown in FIGS. 1A and 1B, when measurement target objects have different heights h1 and h2, the image formation positions of the measurement target objects differ from each other. Therefore, according to a conventional method, the height of a measurement target object is measured while changing the position of the imaging unit 7 with the control unit 8. In FIGS. 1A and 1B, the imaging unit 7 needs to be moved by distance d according to a height difference h1−h2.

In a three-dimensional shape measuring apparatus according to such conventional method, a height measurement can be carried out by a height measuring unit when an image captured by the imaging unit is in focus. To this end, the imaging unit has to move along a z-axis according to the height of a measurement target object before scanning the measurement target object. This poses a problem in that when measuring a three-dimensional shape of a measurement target object, an x, y, and z-axes scan is necessary.

A three-dimensional shape measuring apparatus according to a conventional method is disclosed in Korean Patent Application Publication No. 10-2011-0086222.

SUMMARY

In order to solve the aforementioned problem, there is a need for a method of measuring a three-dimensional shape including a height of a measurement target object only through an x and y-axes scan without performing an additional z-axis scan.

According to one embodiment of the present disclosure, a three-dimensional shape measuring apparatus for acquiring height information of a measurement target object using a prism includes: an illumination unit configured to irradiate light on the measurement target object; a prism unit configured to receive reflective light reflected from the measurement target object and direct the reflective light to an image formation lens; an imaging unit configured to receive the reflective light from the prism unit and capture an image of the reflective light; and a height measurement unit configured to measure a height of the measurement target object based on the image captured by the imaging unit.

In the three-dimensional shape measuring apparatus, the prism unit may be configured to change a phase of the reflective light according to the height of the measurement target object.

In the three-dimensional shape measuring apparatus, the reflective light passing through the prism unit may be provided to the imaging unit as an image having a diameter which varies according to the changed phase.

In the three-dimensional shape measuring apparatus, the prism unit may have a conical shape having a vertex facing the measurement target object.

In the three-dimensional shape measuring apparatus, the prism unit may include a first planar surface portion and a second planar surface portion configured to receive the reflective light and having a predetermined angle with each other.

In the three-dimensional shape measuring apparatus, the height measurement unit may be configured to measure the height of the measurement target object using a diameter of the image.

In the three-dimensional shape measuring apparatus, a distance between the imaging unit and the prism unit may be fixed.

In the three-dimensional shape measuring apparatus, the image formation lens may be configured to receive the reflective light from the prism unit and direct the reflective light to the imaging unit.

The three-dimensional shape measuring apparatus may further include an aperture disposed on a light path of the reflective light between the image formation lens and the prism unit.

The three-dimensional shape measuring apparatus may further include: a first lens having a planar surface facing the prism unit and a convex surface facing the imaging unit; and a second lens having a convex surface facing the first lens and a planar surface facing the imaging unit.

By using the three-dimensional shape measuring apparatus according to one embodiment of the present disclosure, it is possible to provide an apparatus and method for acquiring a three-dimensional shape of a measurement target object by moving an imaging unit on a two-dimensional plane instead of a three-dimension space.

Accordingly, the driving efficiency of the apparatus can be enhanced by reducing the time and mechanical movement distance for acquiring a three-dimensional shape.

DETAILED DESCRIPTION

Figure 1A:
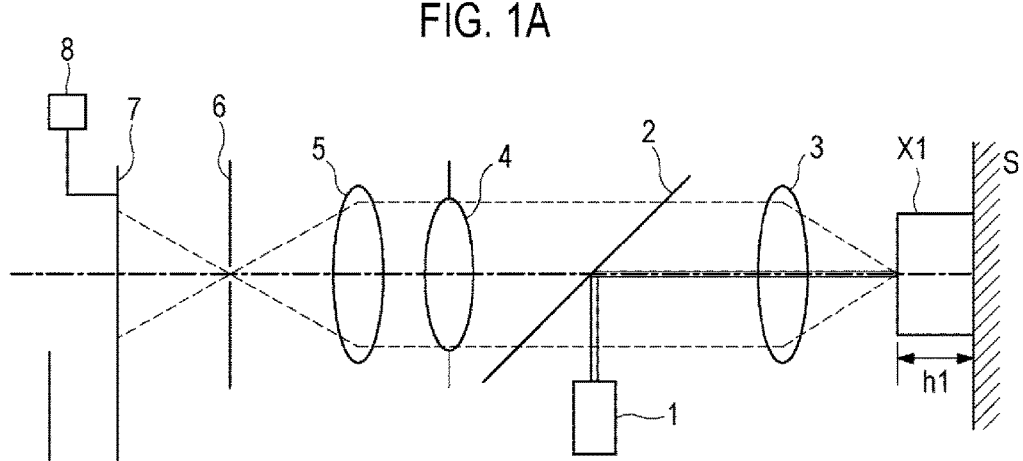
FIGS. 1A and 1B are configuration diagrams of a conventional three-dimensional shape measuring apparatus.
Figure 1B:
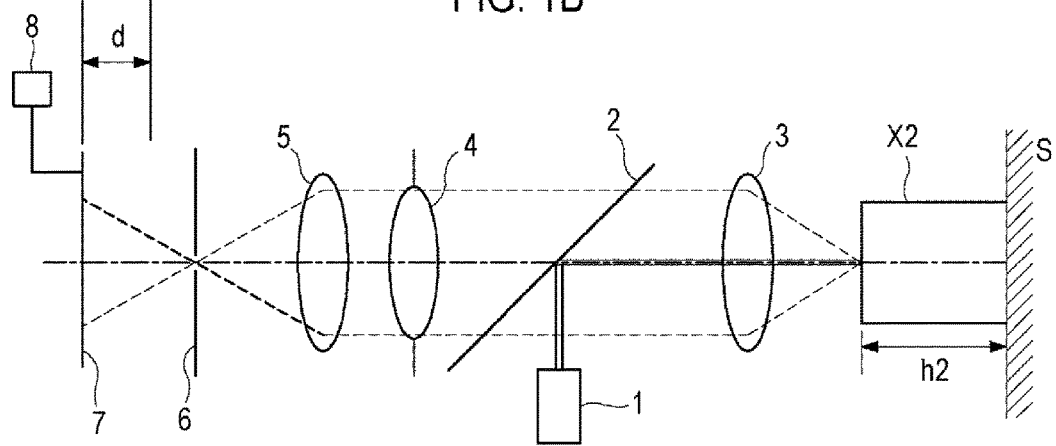

The terms used herein are merely used to describe specific embodiments and are not intended to limit the present disclosure. The singular expression includes plural expressions unless the context clearly indicates otherwise. As used herein, the terms such as "including," "having," and the like are intended to specify the existence of the stated features, numbers, steps, acts, components, parts or combinations thereof and are not intended to preclude in advance the possibility of the existence or addition of one or more other features, numbers, steps, acts, components, parts or combinations thereof.

Unless otherwise defined, all terms used herein, including technical or scientific terms, have the same meanings as generally understood by those having ordinary skill in the art to which the present disclosure belongs. Commonly used terms such as terms defined in a dictionary or the like are to be interpreted as having meanings consistent with the contextual meanings of the related art. Unless clearly defined herein, such terms are not to be construed in an ideal or excessively formal sense. Like reference numerals presented in the drawings denote like members. In explaining the embodiments, if it is determined that a concrete explanation of related well-known functions or configurations unnecessarily obscures the gist of the present disclosure, the detailed description thereof will be omitted. In addition, the size of each component in the drawings may be exaggerated for the sake of explanation and does not mean the size actually applied.

Embodiments of the present disclosure will now be described in detail with reference to the drawings.

Figure 2:
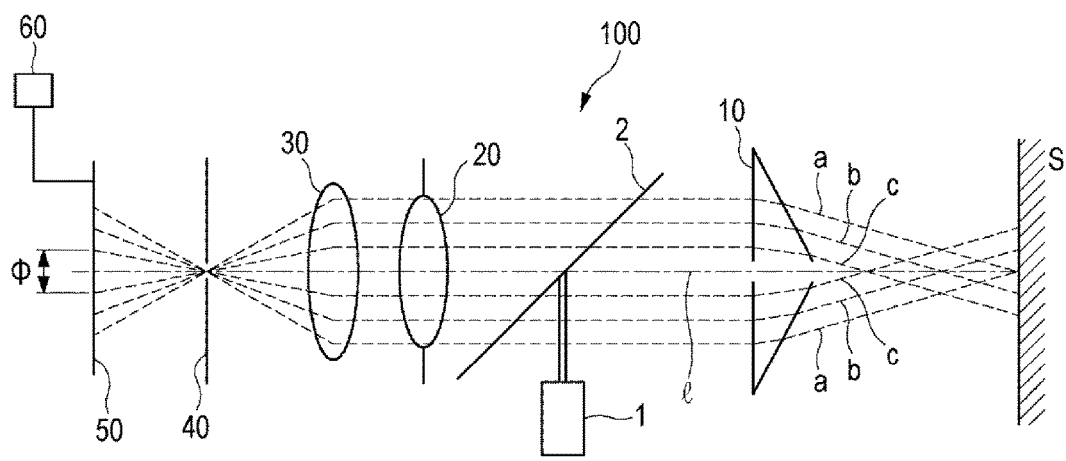
FIG. 2 is a schematic conceptual diagram of a three-dimensional shape measuring apparatus for acquiring height information of a measurement target object using a prism according to one embodiment of the present disclosure.

FIG. 2 is a schematic conceptual diagram of a three-dimensional shape measuring apparatus for acquiring height information of a measurement target object using a prism according to one embodiment of the present disclosure. Referring to FIG. 2, the shape measuring apparatus 100 includes an illumination unit 1 configured to irradiate light toward a substrate S, a prism unit 10 configured to receive reflective light reflected from the substrate S and direct the reflective light to an image formation lens 30, an imaging unit 50 configured to receive the reflective light from the prism unit 10 and capture an image, and a height measurement unit 60 configured to measure the height of a measurement target object based on the image captured by the imaging unit 50. Further, an aperture 20 may be disposed between the prism unit 10 and the image formation lens 30. The light passing through the image formation lens 30 may proceed toward the imaging unit 50 through a pinhole 40.

In one example, the substrate S may be a base plate of a printed circuit board. The measurement target object may be a device formed on the printed circuit board. In addition, the measurement target object may be disposed on one surface of the substrate S to be electrically connected to a pad formed on one surface of the substrate S.

In one example, the illumination unit 1 may irradiate light on the substrate S on which the measurement target object is mounted via a beam splitter 2. The illumination unit 1 may include any illumination device capable of irradiating light having a predetermined wavelength. Accordingly, an LED or a laser may be used as the illumination unit 1 in order to generate light having a predetermined wavelength.

The prism unit 10 may receive the reflective light and direct the reflective light to the image formation lens 30. The image formation lens 30 may transmit the reflective light coming from the prism unit 10 and provide the reflective light to the imaging unit 50. The image formation lens 30 may have a reference plane disposed parallel to the substrate S. Further, the center of the image formation lens 30 may substantially coincide with the center of the substrate S.

The prism unit 10 enables the irradiated light to proceed toward the imaging unit 50 in different phases according to the reflection positions of the irradiated light. To this end, as shown in FIG. 2, the prism unit 10 may be formed to be gradually wider from an end portion facing the measurement target object toward the imaging unit 50. In one example, the prism unit 10 may have a triangular pyramid shape or a conical shape.

In the case where the prism unit 10 has a triangular pyramid shape or a conical shape, when the light passes through the prism, the points at which the light components having the same distance from the center of the prism are collected to make a line. That is, the light components a, b, and c in FIG. 2 meet with corresponding light components in positions spaced apart by different distances from the substrate S. The positions where the light components meet with each other are located on a line l normal to the substrate shown in FIG. 2. Further, such light components a, b, and c are provided to the imaging unit 50 so as to have different diameters Φ.

Accordingly, when light is irradiated on the measurement target object positioned on the substrate and the reflective light thereof passes through the prism, the reflective light reflected from the measurement target object has a phase difference with respect to the reflective light reflected from the substrate. By utilizing such point, the prism unit 10 of the present disclosure enables the reflective light to have a phase difference according to the height of the measurement target object.

Figure 3:
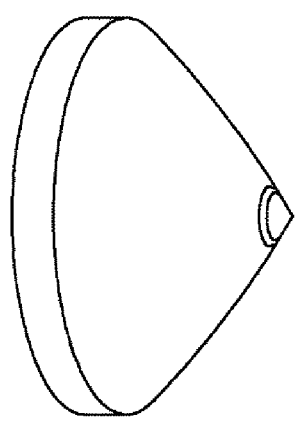
FIG. 3 is an exemplary view in the case where a prism unit has a conical shape according to one embodiment of the present disclosure.

The imaging unit 50 is capable of receiving the reflective light and capturing an image. The captured image may vary according to the type of the prism. In the case where the prism unit 10 has a conical shape as shown in FIG. 3, the captured image may have a circular shape. Further, the diameter of the circular image may vary according to the height of the measurement target object. The distance between the imaging unit and the prism unit may be fixed during the operation.

In one example, the imaging unit 50 may be a CCD or a CMOS element.

The height measurement unit 60 may measure the height of the measurement target object based on the image captured by the imaging unit 50. That is, the height measurement unit 60 may calculate the height of the measurement target object by comparing and analyzing the circumference of the captured image.

In addition, the three-dimensional shape measuring apparatus of the present disclosure may include a control unit (not shown). The control unit may be electrically connected to the illumination unit 1 and the imaging unit 50 to control the operations of the respective components. The control unit may move the position of the three-dimensional shape measuring apparatus to scan the entirety of the measurement target object.

Figure 4A:
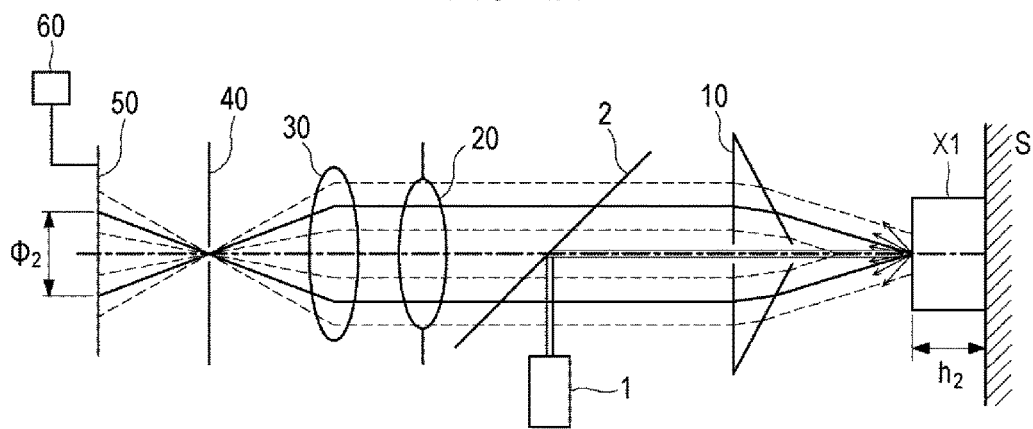
FIGS. 4A and 4B are diagrams for describing operations of a three-dimensional shape measuring apparatus according to one embodiment of the present disclosure.
Figure 4B:
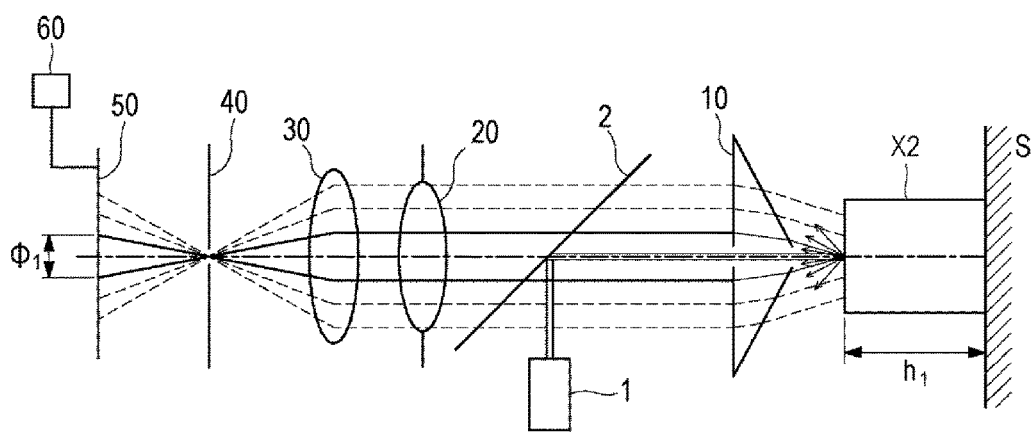

FIGS. 4A and 4B are diagrams for explaining an operation of the three-dimensional shape measuring apparatus according to one embodiment of the present disclosure. Referring to FIGS. 4A and 4B, the measurement target object X1 shown in FIG. 4A has a height h1 and the measurement target object X2 shown in FIG. 4B has a height h2, which is larger than the height h1.

Accordingly, sizes of the images formed when the reflective light reflected from the measurement target objects X1 and X2 is provided to the height measurement unit 60 having a fixed position differ from each other. Specifically, a circumference Φ1 of the image captured by the imaging unit 50 when the reflective light reflected from the measurement target object X2 having a larger height is provided to the imaging unit 50 is smaller than a circumference Φ2 of the image captured by the imaging unit 50 when the reflective light reflected from the measurement target object X1 having a smaller height is provided to the imaging unit 50.

In this manner, the height measurement unit 60 may measure the height of the measurement target object based on the difference between the circumferences of the respective images (the difference between Φ1 and Φ2). In this case, there is an advantage that unlike the prior art, it is not necessary to change the position of the height measurement unit.

Figure 5:
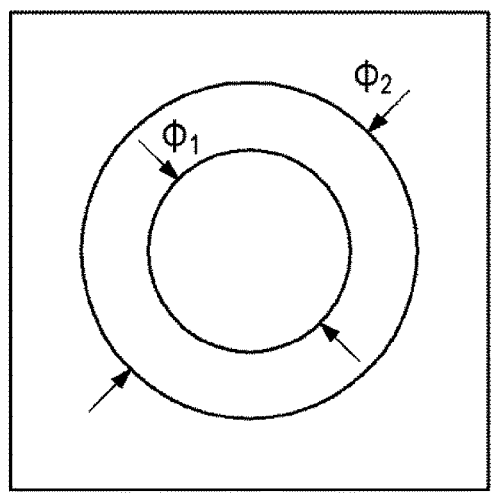
FIG. 5 shows images of different measurement target objects captured by an imaging unit.

FIG. 5 shows images of different measurement target objects captured by the imaging unit. Referring to FIG. 5, the measurement target object for which a circular image having a smaller circumference Φ1 is captured may be measured as having a larger height than the measurement target object for which a circular image having a larger diameter Φ2 is captured.

In one example, the prism unit 10 may have a conical shape in which a vertex faces the measurement target object X1 or X2. However, the present disclosure is not limited thereto.

Figure 6:
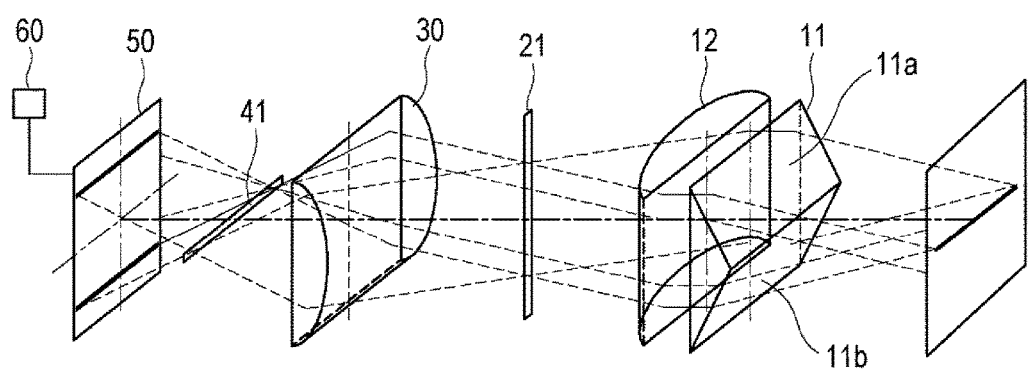
FIG. 6 is a schematic configuration diagram of a three-dimensional shape measuring apparatus according to another embodiment of the present disclosure.

FIG. 6 is a schematic configuration diagram of a three-dimensional shape measuring apparatus according to another embodiment of the present disclosure. In one embodiment, a prism unit 11 may have a triangular cylinder shape as shown in FIG. 6.

In another embodiment, the prism unit 11 may include a first planar surface portion 11a and a second planar surface portion 11b having a predetermined angle with each other. Each of the first planar surface portion 11a and the second planar surface portion 11b may receive light components reflected from a measurement target object and having the same distance from the center of the measurement target object.

In this case, the three-dimensional shape measuring apparatus may further include a first lens 12 having a planar surface facing the prism unit 11 and a convex surface facing the height measurement unit 50. In another embodiment, the three-dimensional shape measuring apparatus may further include a second lens 30 having a convex surface facing the first lens 12 and a planar surface facing the imaging unit 50. The second lens 30 may serve as an image formation lens.

The first lens 12 and the second lens 30 may enable the reflective light passing through the triangular cylindrical prism unit 11 to be captured by the imaging unit 50.

The three-dimensional shape measuring apparatus according to another embodiment may further include a slit-type aperture 21 perpendicular to the longitudinal direction of the triangular cylindrical prism unit 11 and a slit 41 parallel to the longitudinal direction of the triangular cylindrical prism unit 11. As shown in FIG. 6, the slit-type aperture 21 may be disposed between the second lens 30 (or the image formation lens 30) and the triangular cylindrical prism unit 11 and the slit 41 may be disposed on a light path of the imaging unit 50 and the second lens 30.

While the present disclosure has been described with reference to the embodiments shown in the drawings, which are provided merely as exemplary embodiments. It will be understood by a person having ordinary knowledge in the relevant field that many different modifications can be made from the aforementioned embodiments. Such modifications should be deemed to fall within the technical protection scope of the present disclosure. Accordingly, the true technical protection scope of the present disclosure shall be defined by the technical concepts of the appended claims.

What is claimed is:

1. A three-dimensional shape measuring apparatus, comprising:
   a light source configured to irradiate light on a measurement target object;
   a prism configured to:
      direct the light from the light source to be collected on points of a line normal to the measurement target object;
      receive reflective light reflected from a point, at which the light is collected on a surface of the measurement target object, among the points of the line; and
      direct the reflective light to an image formation lens, which is configured to direct the reflective light to a pinhole;
   an image sensor configured to receive the reflective light, which has passed through the pinhole, and capture an image having a size that varies according to a location of the point on the line; and
   a height measuring device configured to measure a height of the measurement target object based on the size of the image captured by the image sensor.

2. The apparatus of claim 1, wherein the prism is further configured to change a phase of the reflective light according to the height of the measurement target object.

3. The apparatus of claim 2, wherein the reflective light which has passed through the pinhole is provided to the image sensor as an image having a diameter that varies according to the location of the point on the line.

4. The apparatus of claim 3, wherein the height measuring device is configured to measure the height of the measurement target object using the diameter of the image.

5. The apparatus of claim 1, wherein the prism includes a first planar surface portion and a second planar surface portion configured to receive the reflective light and having a predetermined angle.

6. The apparatus of claim 5, further comprising:
a first lens having a planar surface facing the prism and a convex surface facing the image sensor; and
a second lens having a convex surface facing the first lens and a planar surface facing the image sensor.

7. The apparatus of claim 1, wherein a distance between the image sensor and the prism is fixed.

8. The apparatus of claim 1, wherein the image formation lens is configured to receive the reflective light from the prism.

9. The apparatus of claim 8, further comprising:
an aperture disposed on a light path of the reflective light between the image formation lens and the prism.

10. The apparatus of claim 1, wherein the prism has a conical shape having a vertex facing the measurement target object.

* * * * *